United States Patent
Kott et al.

(10) Patent No.: US 7,716,300 B2
(45) Date of Patent: May 11, 2010

(54) SYSTEMS AND METHODS TO FACILITATE SELF REGULATION OF SOCIAL NETWORKS THROUGH TRADING AND GIFT EXCHANGE

(75) Inventors: Ryszard K. Kott, Redmond, WA (US); Alwin R. Vyhmeister, Seattle, WA (US); Richard L. Hughes, Monroe, WA (US); Lili Cheng, Bellevue, WA (US); Sean U. Kelly, New York, NY (US); William L. Portnoy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1380 days.

(21) Appl. No.: 11/141,487

(22) Filed: May 31, 2005

(65) Prior Publication Data
US 2006/0190281 A1    Aug. 24, 2006

Related U.S. Application Data

(60) Provisional application No. 60/655,608, filed on Feb. 22, 2005.

(51) Int. Cl.
*G06F 15/173* (2006.01)
*G06F 15/167* (2006.01)

(52) U.S. Cl. .................. 709/216; 709/225; 709/226; 713/182

(58) Field of Classification Search ............ 709/216, 709/225, 226
See application file for complete search history.

(56) References Cited

U.S. PATENT DOCUMENTS

| | | | |
|---|---|---|---|
| 7,415,719 B2* | 8/2008 | Moghe et al. ................ 726/1 |
| 2002/0124053 A1* | 9/2002 | Adams et al. ............... 709/216 |
| 2003/0236837 A1* | 12/2003 | Johnson et al. ............. 709/205 |
| 2004/0091846 A1* | 5/2004 | Aughenbaugh et al. ..... 434/350 |
| 2006/0020814 A1* | 1/2006 | Lieblich et al. ............. 713/182 |
| 2006/0149745 A1* | 7/2006 | Mengerink ................. 707/10 |

OTHER PUBLICATIONS http://www.flickr.com, last accessed Sep. 12, 2005, 1 page.
http://www.friendster.com, last accessed Sep. 12, 2005, 1 page.
https://www.orkut.com/Login.aspx, last accessed Sep. 12, 2005, 1 page.

* cited by examiner

*Primary Examiner*—Christopher J Brown
(74) *Attorney, Agent, or Firm*—Lee & Hayes, PLLC

(57) ABSTRACT

The subject invention provides a unique system and method that facilitates self-regulation of a social network system based at least in part on user behavior, and in particular on good or desirable user behavior. The system and method involve monitoring user behavior such as user activity and user interactions with other users and the network itself. Several factors can be weighed to determine whether the user behavior is good. Network assets or rights can be allocated to good users in the form of gifts or trade exchange opportunities whereas less desirable or bad users may not receive such gifts or trade opportunities or assets and rights might be revoked from them. By watching user behavior and promoting good behavior in this manner, the social network can be managed and self-regulated to optimize the utilization and distribution of both limited and unlimited assets (e.g., network created and user created assets or resources).

19 Claims, 13 Drawing Sheets

SYSTEMS AND METHODS TO FACILITATE SELF REGULATION OF SOCIAL NETWORKS THROUGH TRADING AND GIFT EXCHANGE

CROSS REFERENCE TO RELATED APPLICATION

This application claims the benefit of U.S. Provisional Application Ser. No. 60/655,608, entitled SYSTEM AND METHOD TO FACILITATE SELF-REGULATION OF SOCIAL NETWORKS THROUGH TRADING GIFT EXCHANGE, filed on Feb. 22, 2005, the entirety of which is incorporated herein by reference.

TECHNICAL FIELD

The present invention relates generally to information networks, and more particularly to systems and methods that facilitate regulation of social networks through a reward system.

BACKGROUND OF THE INVENTION

One of the most effective channels of disseminating and obtaining information is through direct, personal relationships referred to as social networks. A social network consists of individuals and their personal relationships to other individuals through which social information and opportunities are exchanged. The direct, personal relationship implies that two people "know" each other and typically have a certain amount of trust for each other. The value of social networks can be demonstrated for example by the "six degrees of separation" phenomenon, which means that the distance between any two individuals in terms of direct personal relationships is relatively small (e.g., 6 degrees or less). Social networks are frequently employed by individuals often without conscious thought. For example, a person may be searching for a job and contact his or her friends to determine if they are aware of available positions. These friends are able to provide reliable information about positions they themselves directly know about. Additionally, these friends can recommend their job-seeking friend for available positions, assuming they consider the job-seeking friend to be qualified, reliable, hard working, and the like. Furthermore, these direct personal relationships can be employed to obtain social information and/or opportunities such as for example information about possible romantic partners, good movies, restaurants, buying, selling, buying or trading of items and services, recommendations for movies, restaurants, romantic partners and the like.

Direct personal relationships are particularly useful in obtaining information and opportunities because of the associated reliability of information and individuals involved. For example, an individual typically is more often willing to swap a vacation home (house-swap) with a friend of a friend, even though the individual may not personally know the friend of a friend, than to house-swap with a stranger. A basis for such trust is that the individual can trust that their immediate friend would not be associated with the person offering to house-swap (e.g., friend of the friend) if the friend of a friend was not reliable or trustworthy. More generally, the immediate friend can be trusted to offer an honest assessment of the trustworthiness of the third party. Social networks are often relied upon for opinion-based information such as for example, movies, restaurants, travel locations, and the like. Such information within a large number of the general populous is typically more relied on than well known restaurant and movie critics.

In the context of a social network, where people post messages possibly with pictures, comments and other type of annotation such as audio or video clips, there is a problem of maintenance and user regulation related to limited system resources and user behavior.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate regulation of a social network system to optimize usage of both limited and unlimited network assets by the network users. In particular, the system and method involve managing the allocation of network assets or resources based at least in part upon user behavior. User behavior can include user actions such as log-in activity or frequency, activity on the network, and/or utilization of network assets as well as nature and frequency of the user communications with other users in the social network. User behavior can also be determined in part by examining feedback from other user(s) as well as user-to-user interaction.

In conventional social network systems, users are typically given a fixed minimum level of network assets which can be generalized in terms of content and quota to create content despite their individual needs. Only some types of assets can be increased per user for a fee paid to the network provider. Otherwise, the vast majority of network assets are either inadequately utilized by some or in high demand by others. Unlike such conventional practices, the subject invention provides for network self-regulation through trading or gifting of such network assets between users and between the network and the user. As a result, network assets can be allocated or redistributed among users in a more equitable manner to optimize their usage particularly when such assets are limited.

Whereas existing social network systems typically have a user or item rating system for self regulation that might include flagging or excluding bad users and items, the subject invention facilitates self-regulation of a social network by promoting and encouraging good behavior to induce resource reallocation as needed. For example, limited network resources such as storage capacity for multimedia objects may be given as a gift or reward between users or by the social network for desirable behavior. In addition, when users are interacting with one another in a positive manner, opportunities for resource trading between such users increase. Hence, good user behavior can be rewarded in this manner. It should be appreciated that self-regulation by gifting and trading (and/or bartering) can also be added to communication software such as instant messaging services and to web portals.

According to an aspect of the invention, the reallocation of network assets can be initiated by a user or by the network system. For instance, a first user may gift an asset or request to trade an asset with another user or with the network system. Alternatively, the network system can initiate similar requests and in some cases, can remove assets from one user to make them available to other users who may be exhibiting a greater demand for them. For example, the network system can evaluate user utilization of one or more different network assets. Non-use of a particular asset can negatively impact the user's behavior determination and thus cause the network system to reallocate this asset from the user's asset store to either the network's asset pool or directly to another user who is exhibiting good behavior.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
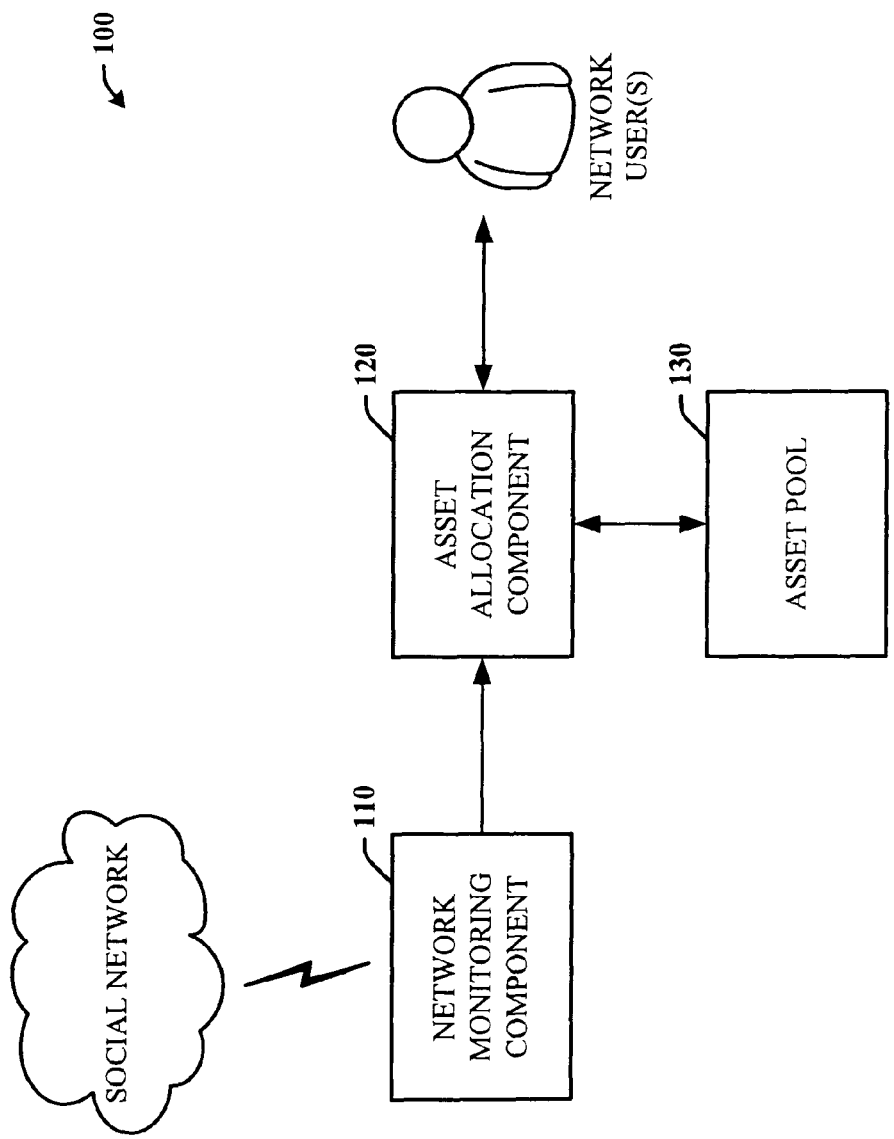
FIG. 1 is a block diagram of a network self-regulation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with distributing or re-allocating social network assets or resources among network users to optimize the utilization of such assets. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Existing social network systems typically have the following approach to maintenance, self regulation, and promotion of good behavior: on the one hand, they have a user or item rating system that might include flagging or excluding bad users and items; and on the other hand, hard limits are imposed for crucial resources such as storage capacity based on a user service payment plan for the system or the system resource capacity. In either instance, such conventional systems are inflexible and not easily adaptable to users' different needs and/or to their changing needs.

The automatic system of the subject invention as described herein allows users to exchange objects or items, including system resources which tend to be more limited in nature as well as user-created objects, with other users and/or with the network (e.g., network provider). Thus, through gifting, bartering, or trading, users have various means to acquire various resources either from each other or from the network or both. This can be accomplished in part by watching user behavior. By doing so, the system can determine who the good users are and promote good behavior by making it easier for good users to be involved in an exchange. For example, some types of items to gift or trade can be made more readily available to them; good users can earn more virtual money necessary for trade; they can earn a right to perform additional actions etc.

Deeming a user to be "good" can be decided in part by user evaluations made by other users. For instance, users can rate the behavior of another user (USER A) according to USER A's postings, content of postings, comments, gift-giving and/or trading activity, and interactions with at least one other user(s). In addition, the network can watch a user's behavior such as network activity, logon activity, gift-giving history, trading history, asset utilization, and the user's interactions with other users. Hence, rather than setting hard limits for asset allocation, the users and the network can actively regulate asset allocation in a more flexible and equitable manner. Such type of system not only rewards good behavior but also promotes more social interactions among the users as gift and item exchanges become additional types of interactions; and the users can actively create gifts and items for trade, thus making the social network environment richer and more interesting.

Referring now to FIG. 1, there is a general block diagram of a social network self-regulation system 100 in accordance with an aspect of the subject invention. The system 100 includes a network monitoring component 110 that can watch and observe social network activity such as activity of network users as well as the distribution, allocation, or utilization of network assets among its users. Data related to such observations can be collected and/or processed and communicated to an asset allocation component 120. The asset allocation component can allocate or re-allocate assets from the network's asset pool 130 for distribution among the network users according to a user's activity or overall behavior. The distribution may or may not be even among the network users. This is because such distribution is based on a user's individual behavior in the social network. Behavior can encompass such elements as user demands of the network, user activity, and interaction with other users. For example, users exemplifying different demands of the network may receive different assets and/or different amounts of any one asset depending on the users' needs. Other factors can be included as well to determine the user's overall behavior and whether it is relatively "good" or relatively "bad". The system 100 encourages good user behavior by enhancing the user's overall experience in the social network. That is, a good user may be given more network assets or more opportunities to acquire network assets whereas a bad user may be treated in a less favorable manner. In some cases, bad users can be suspended from or lose all access privileges to the network.

In addition, the asset allocation component 120 can take network assets from any one user and re-allocate them to other users or to the asset pool 130 for later distribution. Again, this re-allocation is determined according to the user's overall behavior in the social network. For example, the asset allocation component 120 may take away or re-allocate a user's limited network asset(s) (e.g., storage capacity, content quota, network invite, etc.) when such user is determined to be relatively inactive on the social network and thus has not utilized such valuable assets within a given or prescribed time period. The user may be provided with a warning and if no action is taken, the asset(s) can be removed from the user's account or asset store.

Figure 2:
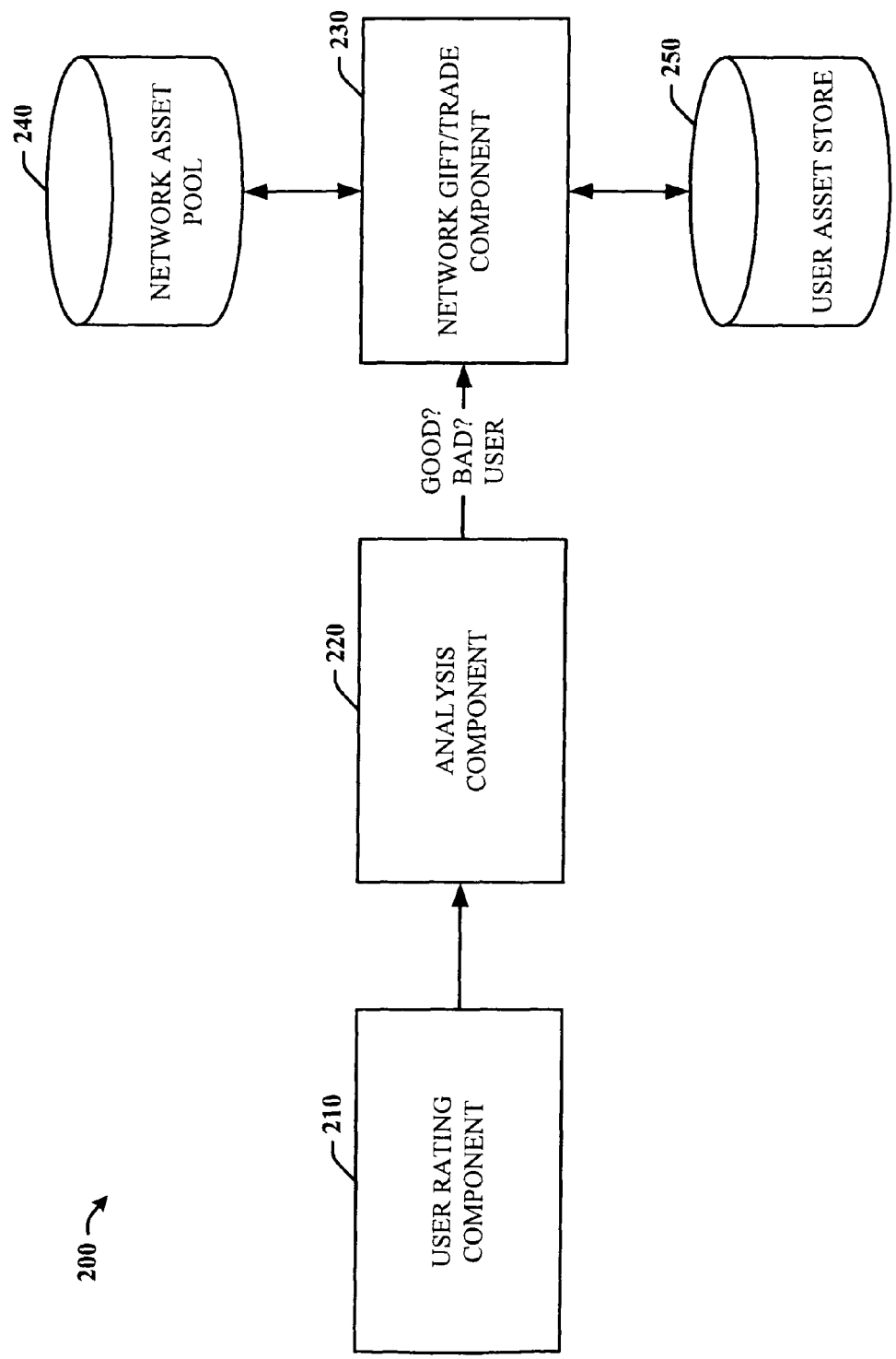
FIG. 2 is a block diagram of a network self-regulation system that facilitates exchanges of objects between the network and one or more users in accordance with an aspect of the subject invention.

Referring now to FIG. 2, there is illustrated a block diagram of a network self-regulation system 200 that facilitates exchanges between the network and one or more of its users based at least in part upon user feedback. The system 200 includes a user rating component 210 that can be employed by at least one user to rate another user's behavior. The rating may be direct (such as rating of a user or their specific action) or indirect (such as rating of the content posted by another user). The rating component 210 can be number based (e.g., scale of 1-10 where 10 is the most desirable score), text based (e.g., poor, fair, good, excellent, etc.), symbol based (e.g., facial expression images depicting varying degrees of dissatisfaction and satisfaction), and the like.

User ratings can be kept anonymous such that the subject user is not aware of his/her ratings, thereby allowing other users to more freely and honestly provide their true opinion of any particular user. This feedback data can be communicated to an analysis component 220 that examines such data to facilitate determining whether the user is relatively good or bad. When this determination is made, it can be communicated to a network gift/trade component 230 that acts commensurate with the user's behavior. This may involve asset allocation, asset quota change or granting or invoking user rights for performing certain actions. For instance, the network gift/trade component 230 can gift one or more network assets to a good user by transferring the appropriate network assets from the network asset pool 240 to the user's asset store 250 or account (not shown). Alternatively or in addition, the network gift/trade component 240 can make certain desirable network assets available for trade with the good user and/or offer to make trades with the user.

A bad user may receive no additional network assets and in some cases may lose at least one or more of their network assets due to their level of inactivity on the network and/or negative user feedback. The various factors employed to determine whether a user is good or bad can be weighed in a number of different ways. Therefore, a bad user can become a good user with relative ease just as a good user can become a bad user. For example, an active network user may be deemed good for a long time and then deemed bad due to a significant decrease of activity on the network. Moreover, regulation of the social network via user behavior (on the network) can occur on a constant and continuous basis; thus a user's status (e.g., good or bad) can change frequently or infrequently as a function of the user's observed behavior.

Figure 3:
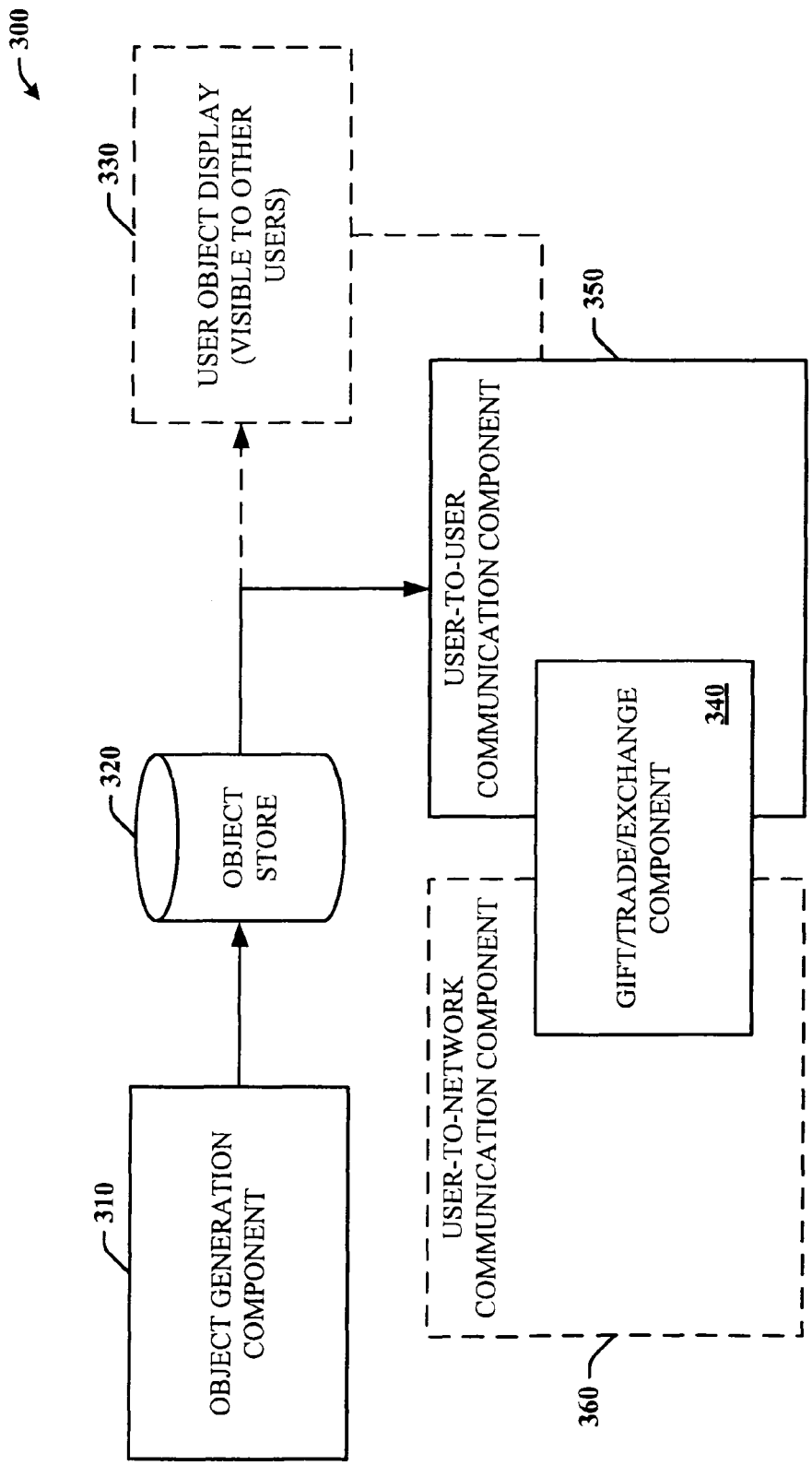
FIG. 3 is a block diagram of a network self-regulation system that facilitates object fabrication (by users) and exchanges of objects between users in accordance with an aspect of the subject invention.

Turning now to FIG. 3, there is demonstrated a block diagram of a social network self-regulation system 300 that facilitates object exchanges between network users in accordance with an aspect of the subject invention. The system 300 includes an object generation component 310 that can generate one or more objects that may be traded or gifted by at least one user. Examples of such objects can include photo images, images, sounds, videos, movies, documents, internet references and the like which are created by a user. User-generated objects can be saved to the user's object store 320. The owner of such objects can choose to display (330) at least a portion of them for other users by making them available for viewing—similar to items display on a fireplace mantel, or by making them available for trading purposes—similar to items displayed at a store window (via a gift/trade/exchange component 340)—or keep them private or hidden from view.

For instance, at least two users can communicate or interact with each other by way of a user-to-user communication component 350 within a social network system. When appropriate or desired, one or both users can display their objects that are available for trading. Hence, an object marketplace atmosphere can be created within the social network. When the relative value of an object is not known by a user, the user can request the social network provider to provide assistance. By monitoring user activity and tracking exchange transactions including object trades or exchanges across the network, the provider can recommend object values or suitable trades based on historical data (e.g., previous trades made between users or between users and the network; previous values assigned to similar objects or similar types of objects; etc.). Gift exchanges can also be made from one user (from his/her object store 320) to at least one other user. The number of (or frequency) of gifts received and/or given by a user can also be factored into the user's behavior. That is, receiving or giving more gifts favors good user behavior. This is because receiving more gifts indicates that the user is popular and presumably well-liked, whereas giving more gifts reflects the generosity of the user.

As previously discussed, users can also communicate with the network by gifting or trading assets and/or user-generated objects via a user-to-network communication component 360. For instance, the network provider may want to remove certain objects from circulation. To do so, the network can offer to trade users having such objects in their possession with other desirable objects or assets. Alternatively, the network provider can gift user-generated objects or assets to users.

Figure 4:
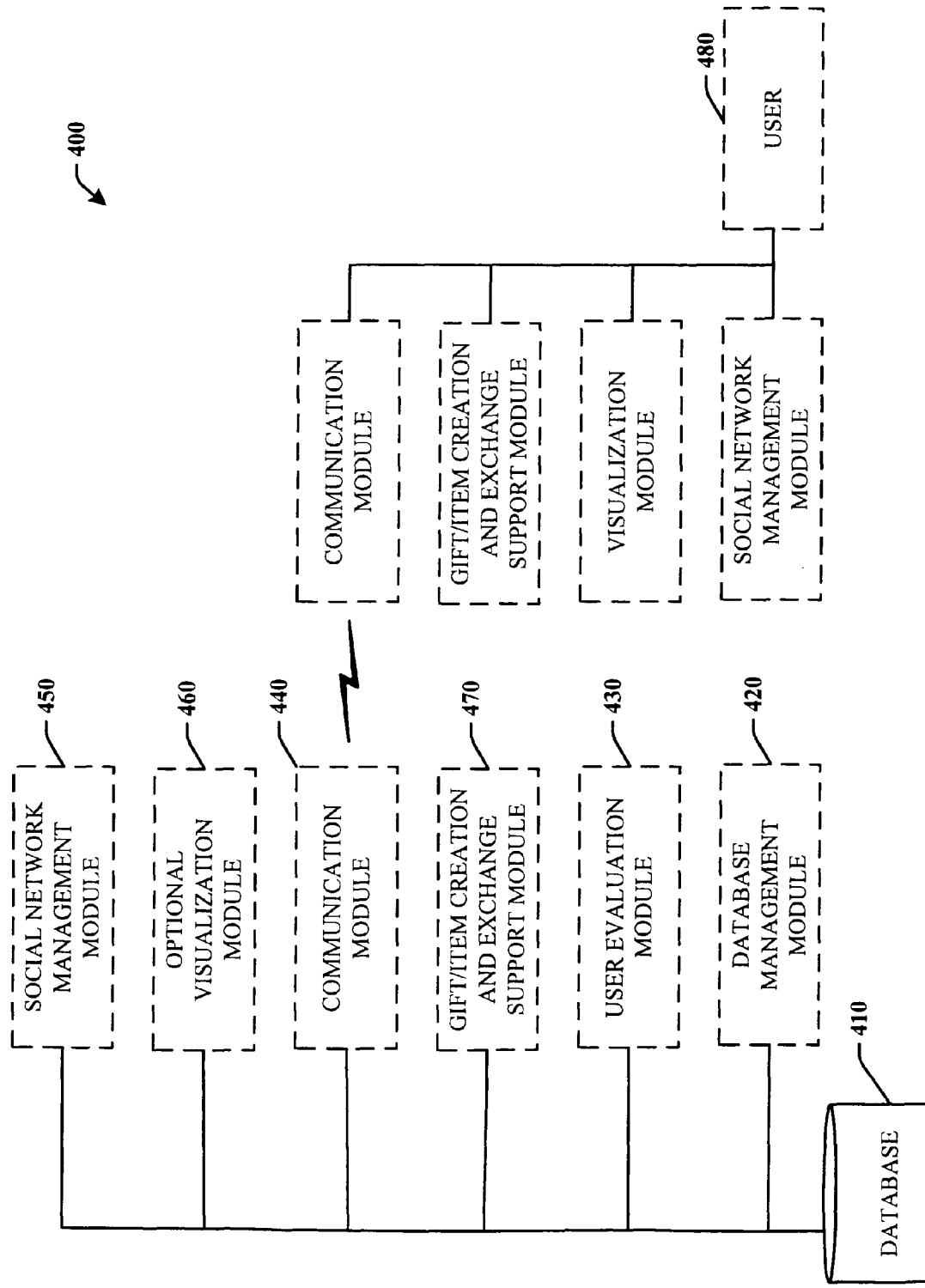
FIG. 4 is a block diagram of a network self-regulation system that facilitates utilizing social information according to an aspect of the invention.

Referring now to FIG. 4, there is schematically illustrated at a high level a block diagram of a social networking system 400 in accordance with the present invention. The system 400 includes a number of modules or components that facilitate self-regulation through gifting and trading. A database 410 keeps track of data posted by the members of a social network as well as gifts and items for trade and virtual accounts for the users. A database layer module 420 facilitates managing objects in the database 410. A behavior evaluation module 430 provides user rating relating to activity and good or bad behavior. A communication module 440 (e.g., web, e-mail, IM, RSS . . . ) facilitates communicating with members of the social network for uploading or downloading data by the members.

An optional computer program supporting a social network on a user side capable of rendering objects such as messages, pictures and annotations for a user who is a member of the social network can be employed. The program can render user data as well as gifts and items for trade whether created by user or system and whether system resource related or not. A social network management module 450 can control a subset of the other modules in connection with carrying out policies and rules that facilitate self-regulation of behavior within the social network. It is to be appreciated that a subset of the modules can employ artificial intelligence systems (e.g., Bayesian networks, neural networks, expert systems, fuzzy logic, Hidden Markov models, etc.) in connection with implementing a probabilistic and/or statistical based approach to facilitating self-regulation in accordance with the subject invention.

The storage 410 can store a variety of data such as for example, user/entity profiles, indices, and a directed graph of a social network. The profiles can include attributes of individuals or entities associated with a social network in accordance with the present invention. The respective profiles can vary as to quantity as well as quality and type of attribute information. In accordance with one aspect of the invention, the profile information is directly input via each respective individual or entity. However, it is to be appreciated that any of a variety of information gathering schemes and sub-schemes (e.g., data mining, cookies, data scavenging, $3^{rd}$ party providers . . . ) could be employed in connection with the subject invention if desired. The directed graph can be a large collection of information relating to individuals and relationships between those individuals. The directed graph can be a graph of vertices and arcs but may also take one or more of many data-structure type forms (e.g., table, relational databases, XML based databases), and functionally represent intra-relationships between subsets of individuals and/or entities within the social network.

An optional visualization module 460 can provide for a rich set of interfaces to enhance user experience with respect to viewing the social network and interactions therein. A gift/item creation and exchange support module 470 facilitates creation/generation of gifts and/or items in accordance with facilitating self-regulation of user behavior. For example, a user 480 might want to mark another user or another user item with a golden star, give another user a picture of a flower bouquet, an animated jumping frog, a right of an additional upload of audio or video clip, a right to invite other users to their network, the user can trade the items as above; and once a user reached a certain threshold in good behavior rating, he is awarded with new capabilities to create gifts or to trade or perform other actions in their social networks that might be restricted.

As shown in FIG. 4, the modules can be replicated at numerous clients so as to create a network of modules that coincide with the social network as manifested within a computer network.

Figure 5:
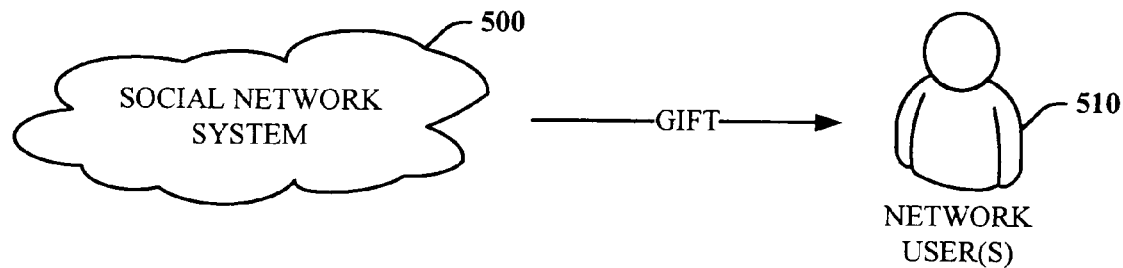
FIG. 5 is a schematic diagram illustrating a gift exchange from a social network system provider to one or more network users in accordance with an aspect of the subject invention.
Figure 6:
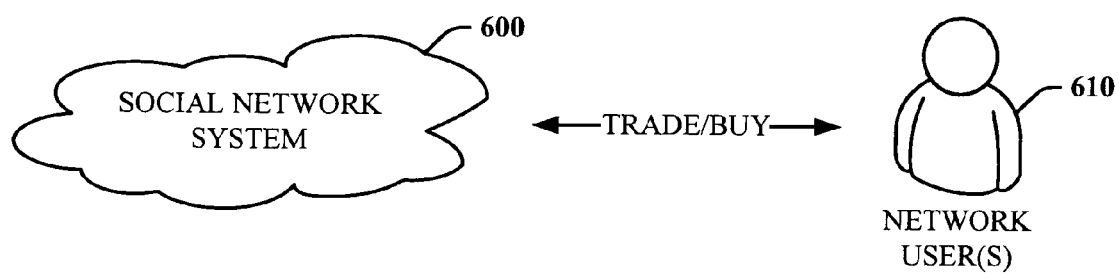
FIG. 6 is a schematic diagram illustrating an object exchange between a social network system provider and one or more network users in accordance with an aspect of the subject invention.
Figure 7:
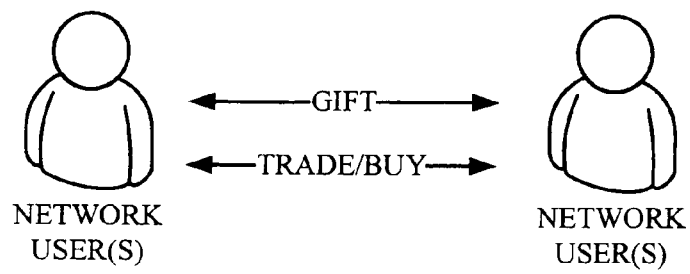
FIG. 7 is a schematic diagram illustrating an object exchange between network users in accordance with an aspect of the subject invention.
Figure 8:
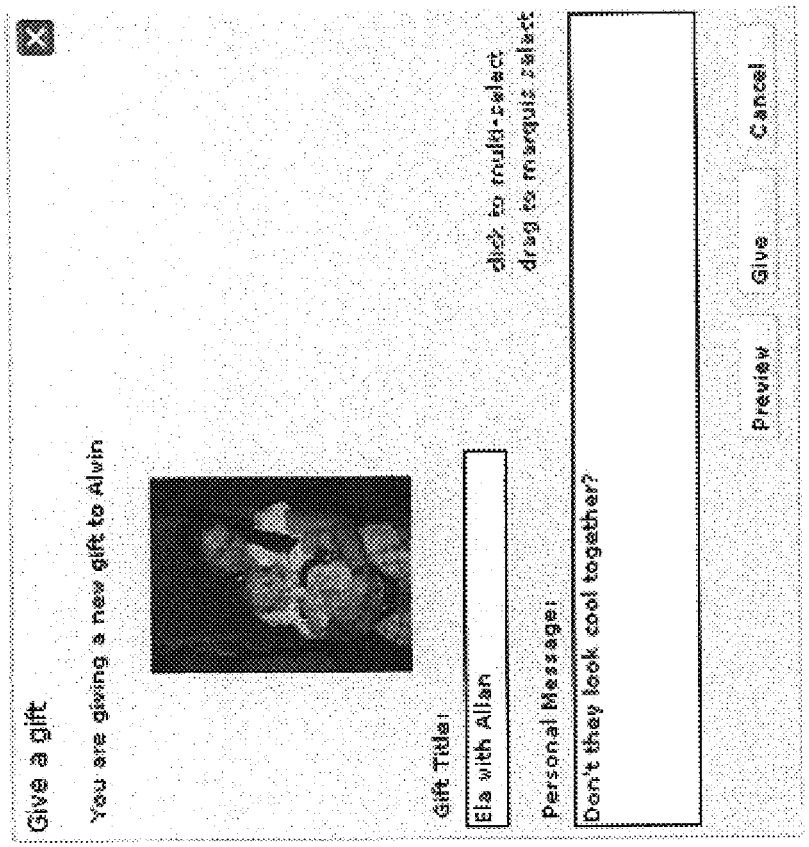
FIG. 8 illustrates an exemplary user interface for giving a gift to at least one network user in accordance with an aspect of the subject invention.

Turning now to FIGS. 5-7, there are illustrated schematic representations of various exchanges between a social network system and one or more network users and/or between two or more network users that facilitate management and self-regulation of the networks' assets. In FIG. 5, the social network system 500 can gift one or more network assets to one or more network users 510 based in part upon the users' behavior and/or current asset demands or needs. For example, if a network user exhibits a need for more storage capacity and at the same time has also demonstrated "good" behavior, then the social network system can gift an additional amount of storage capacity to this user. This extra storage capacity can permit the user to create and/or store more objects (e.g., files, documents, images, sound clips, music, video, etc.).

Alternatively or in addition, the user's good behavior can also be rewarded with a gift of additional system invites—which allows the user to invite new users to join the social network system. Because each network user consumes a certain amount of network assets or resources, system invites may be limited and thus seen as a valuable asset to possess from the user's perspective.

Though not depicted in FIG. 5, it is also possible for a network user to gift or freely give one or more network assets back to the network system 500. For instance, when the network user chooses not to sit on some network asset, he/she can gift it back to the social network system 500. Such acts by the user can also be factored into the user's behavior determination.

FIG. 6 demonstrates a trade or purchase interaction between a social network system 600 and one or more network users 610 in accordance with an aspect of the subject invention. Depending on a network user's behavior, more or less opportunities to conduct exchanges with the social network system 600 can be available to the user. When the opportunity arises, however, the user can offer to trade one or more of his/her assets for at least one network asset. Network assets that are available for trade or purchase (with virtual currency) can be displayed to at least the interested user.

Virtual currency can be obtained via gifts from the social network system 600, in exchange for some asset currently owned by the user or through system generated awards for good behavior or for certain types of actions.

In some cases, the social network system 600 may desire to remove some assets, limited or unlimited—from the social network marketplace and/or network users. Imagine that the network system 600 wishes to decrease the number of system invites. To do so, the network system 600 can offer to any network user in possession of at least one system invite to trade or buy the invite back from them.

In other cases, the social network system 600 may notice that certain assets, which are limited in nature and are low in supply in its asset pool, are also infrequently gifted or traded between network users. To increase circulation of such assets, the social network system 600 can offer to buy or trade other assets for these more scarce assets with the network users. Here again, the willingness to buy or trade with the network 600 can influence the user's behavior determination.

In FIG. 7, network users can gift, trade, and/or buy assets among each other. Such activity or the frequency of such activity can be included as a factor of their individual behavior determination. Higher levels of these types of activities can positively affect the user's behavior determination as it provides more opportunities for users to give feedback on their interactions with any particular user. Network users can gift, trade, or otherwise exchange network-generated assets as well as user-created assets such as images, movies, videos, sound clips, documents, and the like, for example. Objects available for trade or exchange can be made visible to other users who may be browsing the "marketplace" or can be hidden from general view and only shown to specific users. In some instances, such as for security reasons, the social network system may block or restrict certain types of exchanges (e.g., gift, trade, or buy) between users. The restrictions may be based on the content of the objects sought for exchange or may be based on one or more users involved in the exchange. In general, users can be required to follow gifting or exchange guidelines and attempted deviations from such guidelines can negatively impact their individual behavior determinations.

Turning now to FIGS. 8-11, there are illustrated exemplary user interfaces which demonstrate various aspects of the subject invention. Beginning with FIG. 8, an exemplary display screen 800 for giving a gift to one user named Alwin from another user (e.g., gift sender) is shown. In this scenario, the gift is a photo image entitled "Ela with Allan" that presumably was created by the gift sender. The gift sender can include a personal message with the gift as well as preview or cancel the gift before it is sent to the recipient (Alwin). Furthermore, multiple objects can be included in a single gift as desired by the gift sender.

Figure 9:
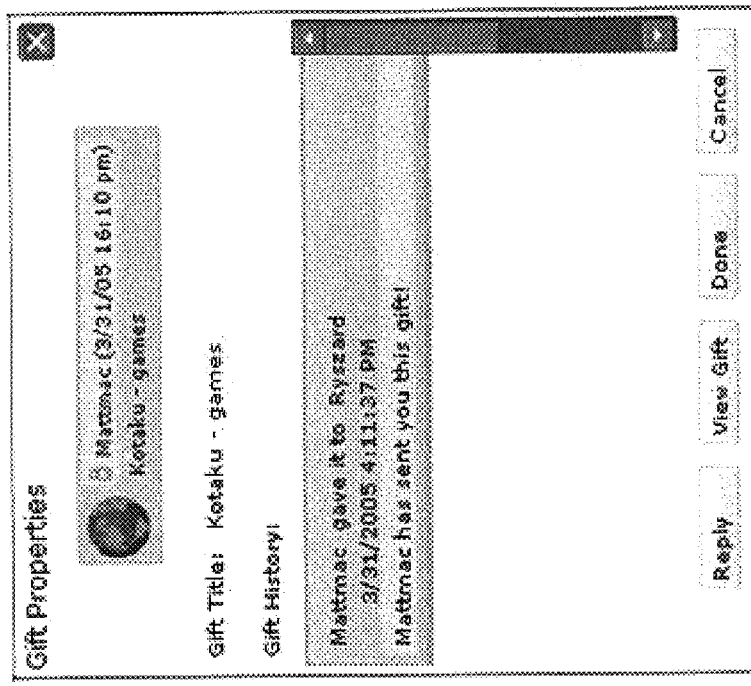
FIG. 9 illustrates an exemplary user interface for viewing gift properties and gift giving history in accordance with an aspect of the subject invention.
Figure 11:
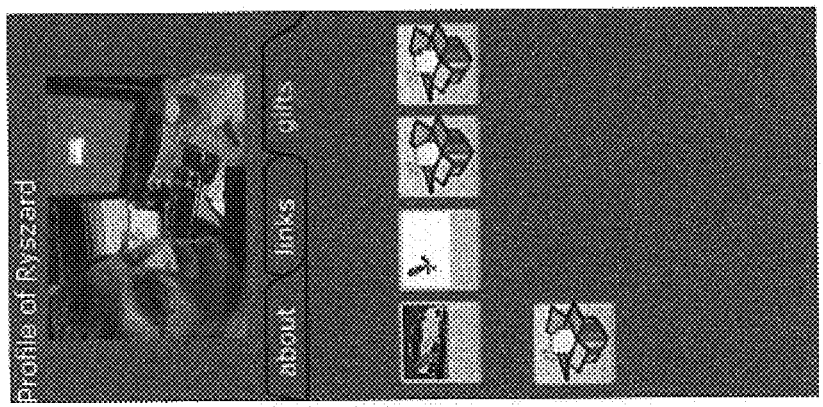
FIG. 11 illustrates an exemplary user interface of a user's profile in accordance with an aspect of the subject invention.
Figure 10:
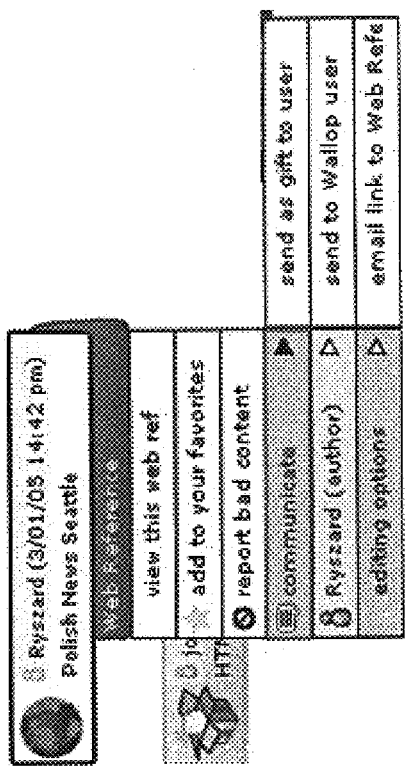
FIG. 10 illustrates an exemplary user interface of available menu options for a web reference object in accordance with an aspect of the subject invention.

In FIG. 9, a gift properties display screen 900 is represented. In this view, a user can look at the properties associated with a gift such as the gift title, when it was sent and by whom. In addition, the user or gift recipient can reply to the gift sender if desired. FIG. 10 illustrates a menu screen of an exemplary gift: a web reference object, and in particular, the various options available to the object's author (Ryszard) such as sending the web reference object as a gift to another user (e.g., "communicate" is highlighted by the user). Meanwhile, FIG. 11 shows the profile of a network user named Ryszard including personal information as well as gifts received and/or sent to other users.

While certain ways of displaying information to users are shown and described as exemplary user interfaces, those skilled in the relevant art will recognize that various other alternatives can be employed. The screens are stored and/or transmitted as display descriptions, as graphical user interfaces, or by other methods of depicting information on a screen (whether personal computer, PDA, mobile telephone, or other suitable device, for example), where the layout and information or content to be displayed on the page is stored in memory, database, or other storage facility.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 12:
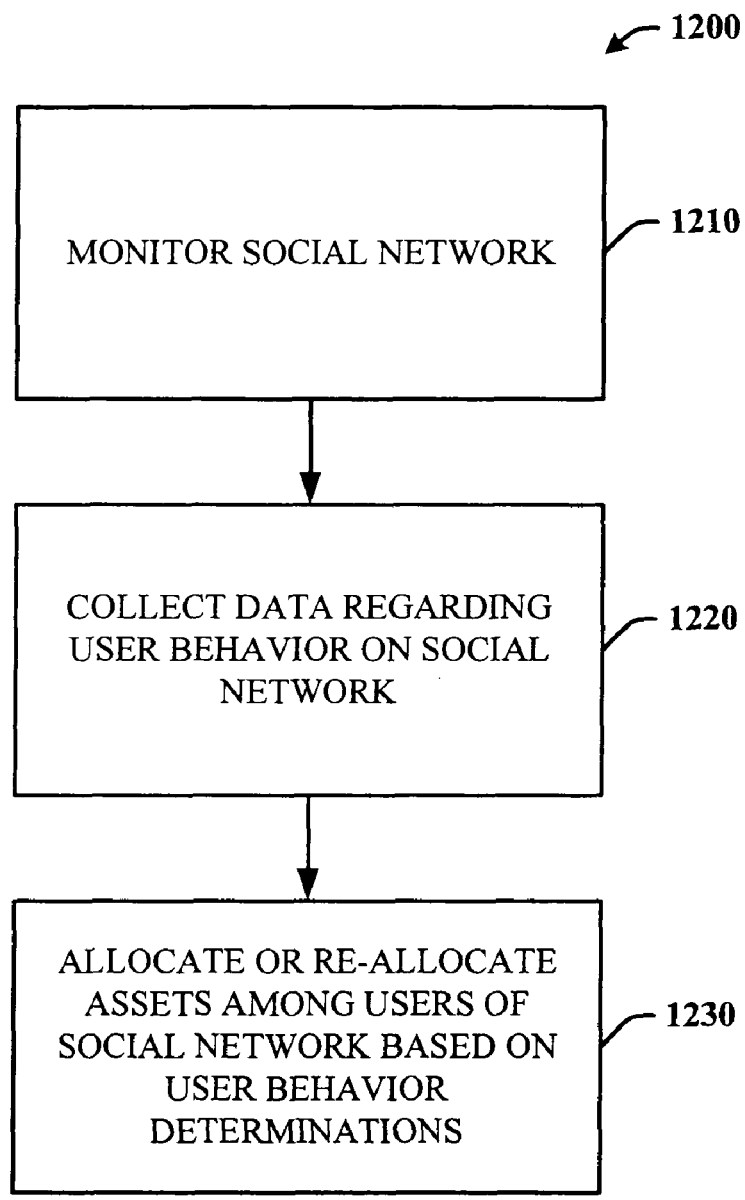
FIG. 12 is a flow chart illustrating an exemplary methodology that facilitates managing a social network through self-regulation in accordance with an aspect of the subject invention.

Referring now to FIG. 12, there is a flow diagram of an exemplary method 1200 that facilitates self-regulation of a social network system in accordance with an aspect of the subject invention. The method 1200 involves monitoring or observing a social network system at 1210 and collecting data in connection with user behavior on the network at 1220. In particular, user behavior can include such factors as user activity on the network, user logon frequency, content and/or frequency of postings or comments made by the user, trades, gifting, or other exchanges made by the user, utilization of currently held assets, ratings or feedback about the user (provided by other users), and the like. These various factors can be employed to determine whether the user's overall behavior is good. Good behavior can be rewarded by the social network in terms of allocating or re-allocating one or more assets to the user at 1230. That is, good user behavior with respect to the social network is encouraged and promoted via providing such "good" users with more desirable or more needed network assets to make the user's experience in the social network more enjoyable and worthwhile. It should be appreciated that a right to perform certain types of actions in the social network is also considered an asset.

Promoting good user behavior also optimizes network asset usage. For instance, users who fail to use their network assets, particularly those that are limited in quantity, may lose them. The network can view this non-use as inefficient for the operation of the social network system and remove such assets from the user. These assets can be returned to the network's asset pool for later distribution or can be re-allocated directly to one or more users who have exhibited the requisite behavior.

Assets, as described hereinabove, can generally be characterized as the following: content, quota to create content as well as a right to perform specific actions in the social network. Quota can include storage capacity; memory for downloading or viewing specific types of content such as music, videos, and images; and/or bandwidth (e.g., network or server bandwidth)—all of which can be considered limited in nature. In many cases, content has a cost to the social network system provider. The cost can be characterized as network bandwidth, storage capacities, and the like. Thus, to optimize the operation of the social network system and to minimize or maintain operation costs, the network can self-regulate the allocation of its limited and unlimited assets among the network users based on the users' behavior or interactions with and within the network.

Figure 13:
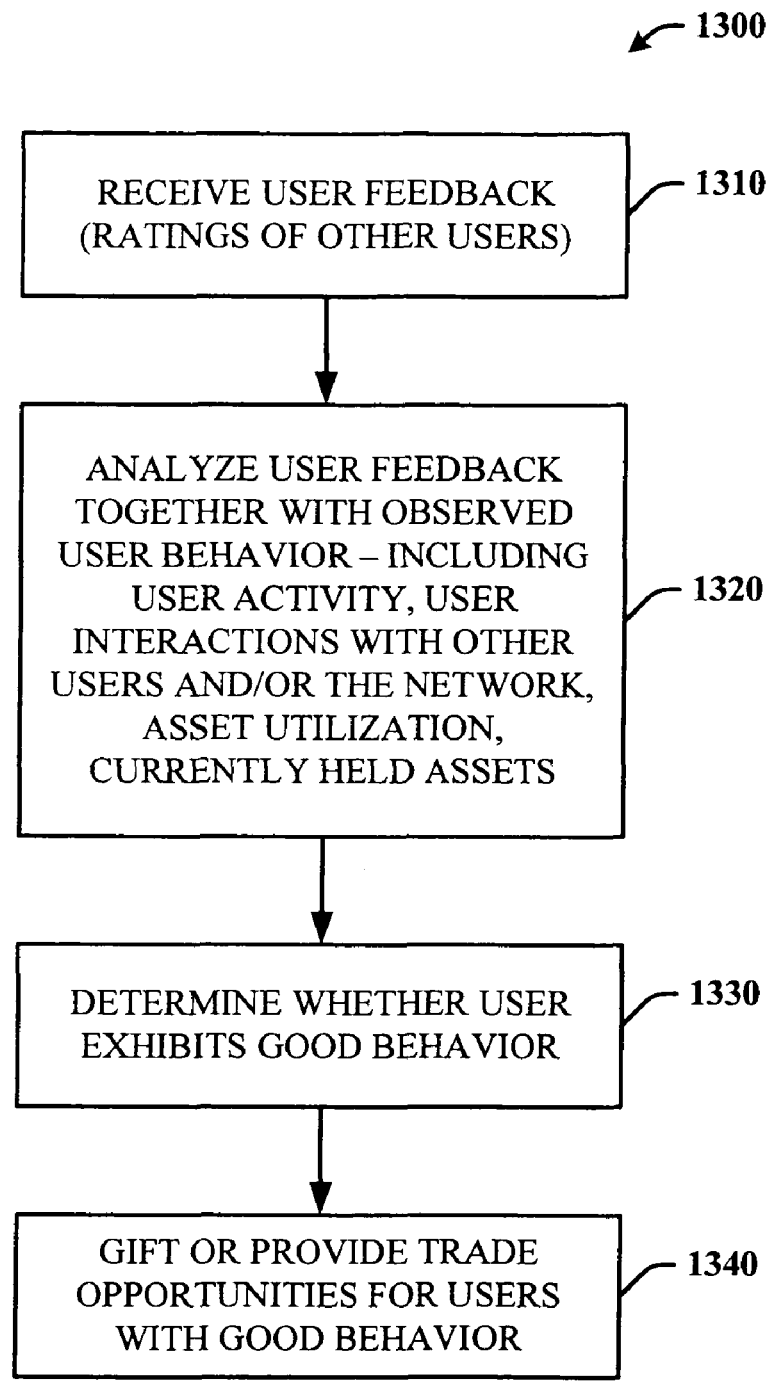
FIG. 13 is a flow chart illustrating an exemplary methodology that facilitates distribution of social network assets or resources through self-regulation in accordance with an aspect of the subject invention.

Turning now to FIG. 13, there is illustrated a flow diagram of an exemplary method 1300 that facilitates self-regulation of a social network system in part by assessing the behavior of each or substantially all network users. The method 1300 involves receiving user feedback at 1310. User feedback can be in the form of a rating whereby one user rates the content provided by the user. For instance, the one user can rate a posting made by another user. The rating system can be symbol-, number-, text- or letter-based. At 1320, the user feedback together with other user behavior observed by the network system can be analyzed. For example, user activity, user interactions or transactions with other users and/or with the network directly, asset utilization, and currently held assets can be tracked or watched to determine whether the user exhibits good behavior at 1330. At 1340, the method 1300 can gift assets, offer to trade assets, or provide trade opportunities for users with a good behavior standing.

Figure 14:
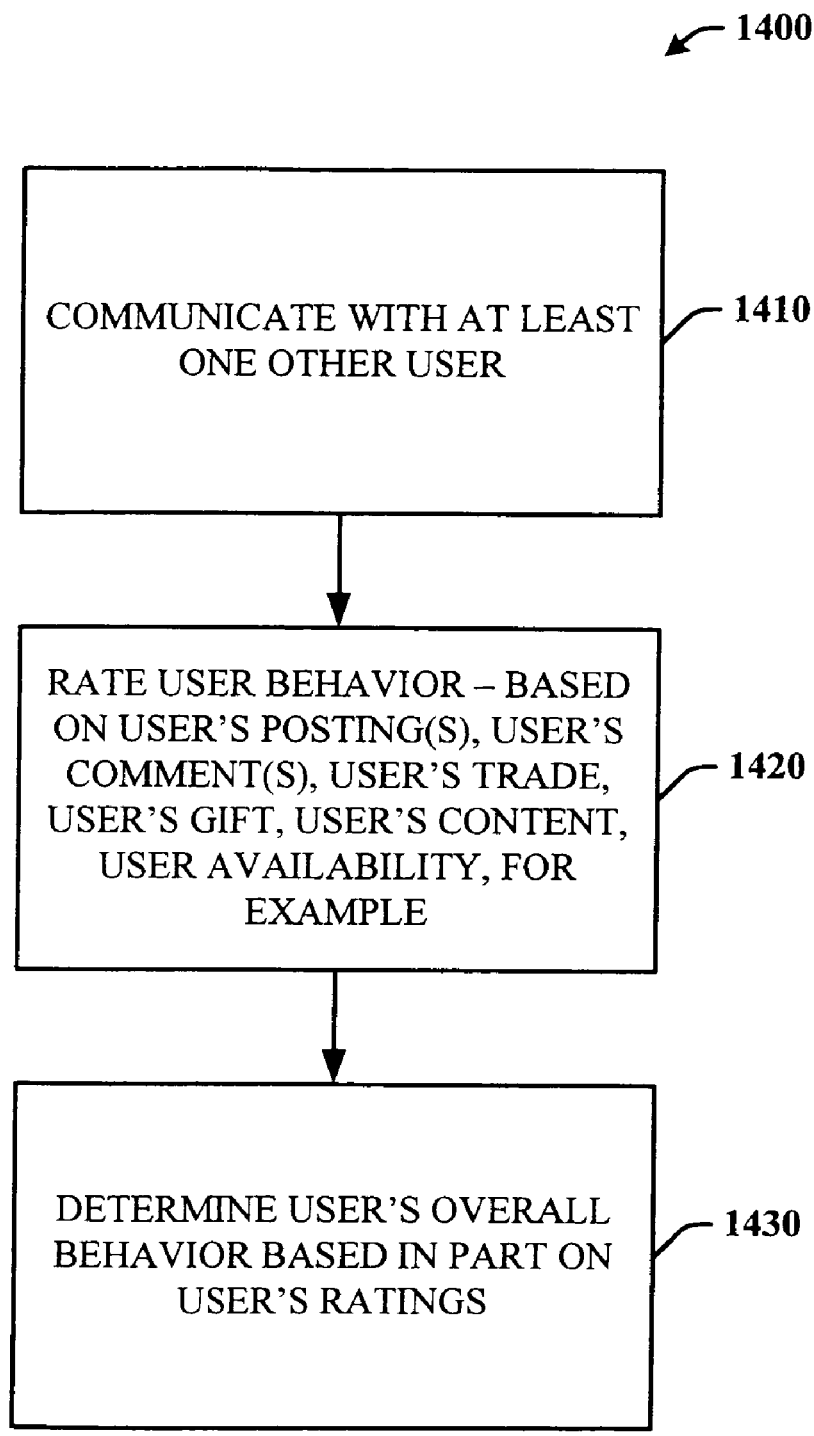
FIG. 14 is a flow chart illustrating an exemplary methodology that facilitates an exchange of object(s) between users of a social network system in accordance with an aspect of the subject invention.

Finally, FIG. 14 provides a flow diagram of an exemplary method 1400 that facilitates determining a user's overall behavior with respect to the social network system to assist in the self-regulation of the system. The method 1400 involves communicating with at least one other user at 1410 such that the (at least one) other user's behavior can be rated based on at least one of the following: the user's comments, user's trade or willingness to trade, user's gift, user's content in general, and/or the availability of the user. At 1430, the (at least one other) user's overall behavior or health can be measured at least in part on ratings received from network users interacting with him/her. By including user-based ratings, the network system can obtain a more comprehensive view or understanding of any network user to assist in the distribution or re-allocation of valuable and sometimes scarce network assets.

Figure 15:
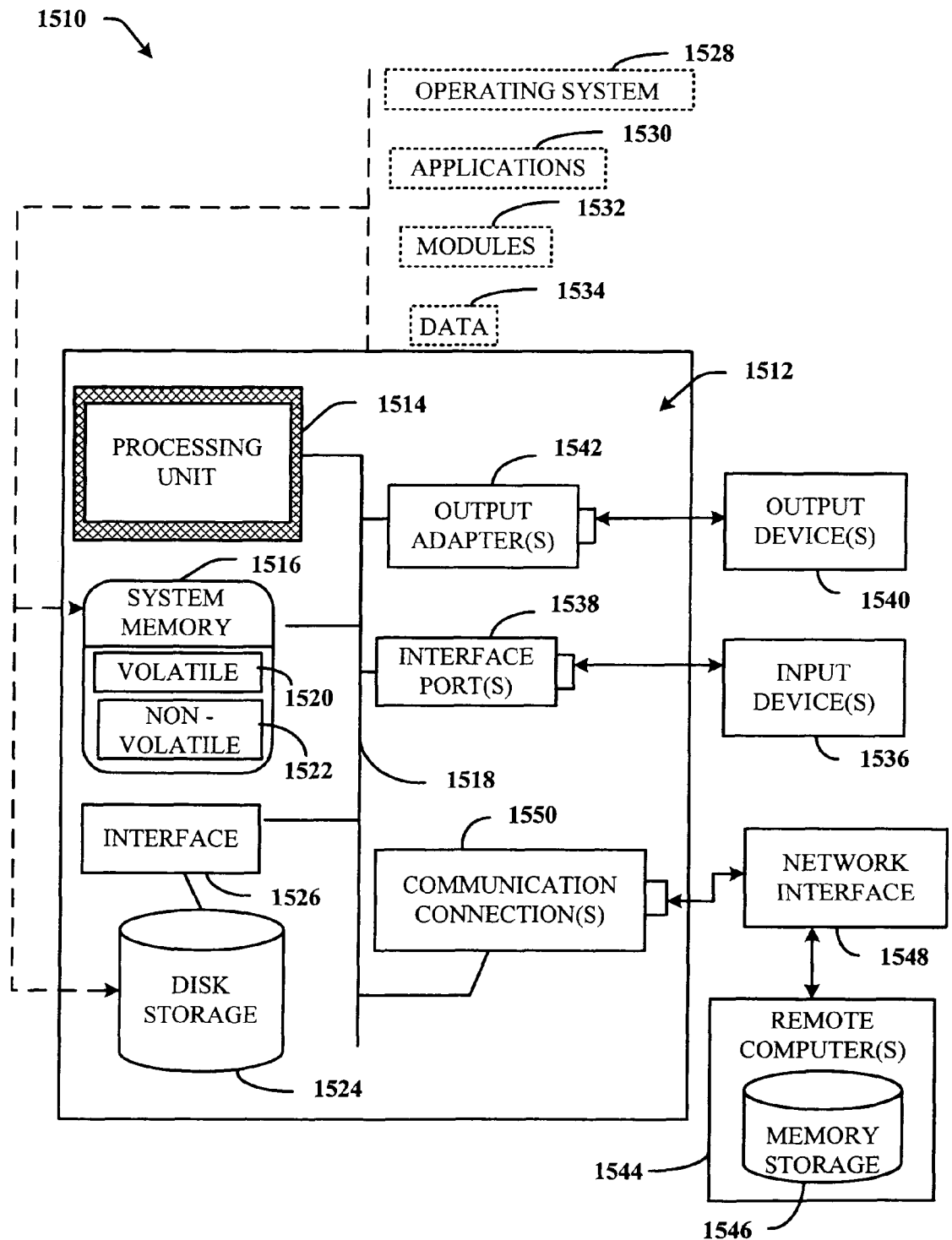
FIG. 15 illustrates an exemplary operating environment for implementing various aspects of the invention.

In order to provide additional context for various aspects of the subject invention, FIG. 15 and the following discussion are intended to provide a brief, general description of a suitable operating environment 1510 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

Figure 16:
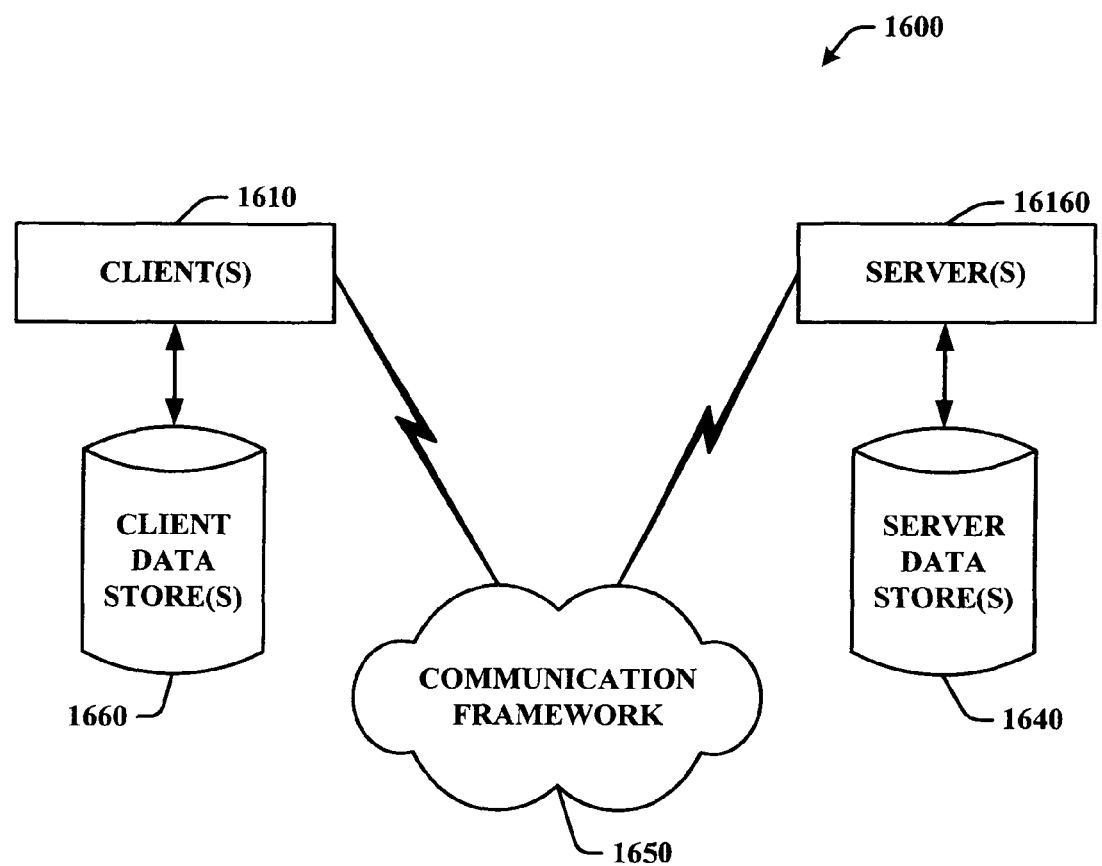
FIG. 16 is a schematic block diagram of an exemplary communication environment in accordance with the present invention.

FIG. 16 is a schematic block diagram of a sample computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the present invention, for example. One possible communication between a client 1610 and a server 1630 may be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates self-regulation of a social network, comprising:
   a computing device having one or more processors, the computing device including:
   a network monitoring component that watches user behavior on the social network;
   an asset allocation component that allocates or re-allocates one or more assets among one or more network users based at least in part on whether the user behavior is desirable, the asset allocation component further re-allocating one or more assets from at least one network user to either one or more other network users or a social network asset pool for later distribution when the user behavior is not desirable; and
   a rating component that determines whether the user behavior is desirable or not desirable based on each of the following: network activity, logon activity, gift-giving history, trading history, asset utilization, interaction with users, and feedback from other users.

2. The system of claim 1, wherein the assets comprise content, quota to create the content and rights to perform certain actions in the social network.

3. The system of claim 1, wherein the assets comprise social network-created and user-created assets.

4. The system of claim 1, wherein the asset allocation component allocates one or more assets to at least one network user when the network user behavior is determined to be desirable.

5. The system of claim 1, wherein the rating component rates at least one network user's content as well as character and frequency of the user's actions to facilitate determining whether the network user's behavior is desirable.

6. The system of claim 1, further comprising a trade exchange component that provides opportunities to trade or exchange one or more objects between a network users or between the social network and the network user when the network user behavior is determined to be desirable.

7. The system of claim 1, further comprising a plurality of modules that provide network users with an ability to gift, barter, generate, and/or trade objects based at least in part on the users' individual behavior to facilitate promoting good behavior on and optimized operation of the social network.

8. The system of claim 7, further comprising an artificial intelligence component that facilitates regulating user behavior on the social network.

9. A computer-implemented method that facilitates self-regulation of a social network, comprising:
   observing, by a processor of a computing device, user behavior within the social network;
   allocating, by the processor of the computing device, one or more assets among network users and re-allocating one or more assets from at least one network user to either one or more other network users or a social network asset pool for later distribution based at least in part on their individual behavior; and determining whether the individual behavior is desirable or not desirable based on each of the following: network activity, logon activity, gift-giving history, trading history, asset utilization, interaction with users, and feedback from other users.

10. The method of claim 9, further comprising providing network users with an ability to gift, barter, generate, and/or trade assets in connection with behaving in a desirable manner on the social network.

11. The method of claim 9, further comprising allocating virtual monies, network assets and user rights to one or more network users in connection with rewarding desirable user behavior.

12. The method of claim 9, further comprising performing a probabilistic-based utility analysis in connection with regulating the social network based in part on user behavior.

13. The method of claim 9, further comprising collecting and analyzing user feedback about at least one network user to determine whether the network user exhibits desirable behavior.

14. The method of claim 9, further comprising offering to trade one or more assets with at least one network user to optimize utilization of the one or more assets.

15. The method of claim 9, wherein the assets comprise content, quota to create the content, as well as rights to perform certain actions in the social network.

16. The method of claim 9, wherein the assets comprise network-generated assets and user-generated assets.

17. A system that facilitates self-regulation of a social network, comprising:
    a computing device having one or more processors, the computing device including:
    means for watching user behavior on the social network;
    means for allocating one or more assets among one or more network users based at least in part on whether the user behavior is desirable; and
    means for re-allocating one or more assets from at least one network user to either one or more other network users or a social network asset pool for later distribution when the user behavior is not desirable, a determination of whether user behavior is desirable or not desirable being based on each of the following: network activity, logon activity, gift-giving history, trading history, asset utilization, interaction with other users, and feedback from other users.

18. The system of claim 17, further comprising means for providing opportunities to trade or exchange one or more objects between a network users or between the social network and the network user when the network user behavior is determined to be desirable.

19. The system of claim 17, wherein the assets comprise content, quota to create the content as well as rights to perform certain actions in the social network.

* * * * *